US007747544B2

(12) United States Patent
Cordery et al.

(10) Patent No.: US 7,747,544 B2
(45) Date of Patent: Jun. 29, 2010

(54) METER TAPE WITH LOCATION INDICATOR USED FOR UNIQUE IDENTIFICATION

(75) Inventors: Robert A. Cordery, Danbury, CT (US); Erik D. N. Monsen, Shelton, CT (US); Claude Zeller, Shelton, CT (US); Matthew J. Campagna, Ridgefield, CT (US)

(73) Assignee: Pitney Bowes Inc., Stamford, CT (US)

( * ) Notice: Subject to any disclaimer, the term of this patent is extended or adjusted under 35 U.S.C. 154(b) by 908 days.

(21) Appl. No.: 11/295,980

(22) Filed: Dec. 7, 2005

(65) Prior Publication Data

US 2007/0130091 A1 Jun. 7, 2007

(51) Int. Cl.
*G06F 17/00* (2006.01)

(52) U.S. Cl. ....................................... 705/408; 705/410

(58) Field of Classification Search ............. 705/60–62, 705/401–411

See application file for complete search history.

(56) References Cited

U.S. PATENT DOCUMENTS 4,376,299 A 3/1983 Rivest
4,649,266 A 3/1987 Eckert
4,725,718 A 2/1988 Sansone et al.
4,757,537 A 7/1988 Edelmann et al.
4,775,246 A 10/1988 Edelmann et al.
4,813,912 A 3/1989 Chickneas et al.
4,831,555 A 5/1989 Sansone et al.
4,873,645 A 10/1989 Hunter et al.
4,900,941 A 2/1990 Barton et al.
5,075,862 A 12/1991 Doeberl et al.
5,098,130 A 3/1992 Mikhail
5,293,319 A 3/1994 DeSha et al.
5,384,886 A 1/1995 Rourke
5,454,038 A 9/1995 Cordery et al.
5,509,109 A 4/1996 Kim et al.
5,680,463 A 10/1997 Windel et al.

(Continued)

FOREIGN PATENT DOCUMENTS

EP 0 952 558 A2 10/1999

(Continued)

OTHER PUBLICATIONS

USPS Publication No. 25 "Designing Letter Mail," Aug. 1995.

(Continued)

*Primary Examiner*—Igor Borissov
(74) *Attorney, Agent, or Firm*—Brian A. Lemm; Angelo N. Chaclas

(57) ABSTRACT

A method for producing a metered tape and an indicium on a meter tape comprising determining a location on the meter tape where the indicium is to be printed, generating the indicium with information related to the location incorporated therein, and printing the indicium on the meter tape at the location. A method of authenticating an indicium printed on a meter tape comprising retrieving information stored within the indicium, the information identifying a first location where the indicium is supposed to be positioned relative to the meter tape, detecting a spatial indicator identifying a second location where the indicium is actually positioned relative to the meter tape, and comparing the first location to the second location. Mail metering and authenticating systems for implementing the methods are also disclosed.

13 Claims, 6 Drawing Sheets

U.S. PATENT DOCUMENTS

| | | | | |
|---|---|---|---|---|
| 5,774,554 | A | 6/1998 | Gilham | |
| 5,822,738 | A | 10/1998 | Shah et al. | |
| 5,992,601 | A | 11/1999 | Mennie et al. | |
| 6,240,196 | B1 * | 5/2001 | Fischer et al. | 382/100 |
| 6,292,709 | B1 | 9/2001 | Uhl et al. | |
| 6,363,164 | B1 | 3/2002 | Jones et al. | |
| 6,386,590 | B1 * | 5/2002 | Fabel | 283/62 |
| 6,409,294 | B1 * | 6/2002 | Zimmermann et al. | 347/2 |
| 6,428,219 | B1 | 8/2002 | Stier et al. | |
| 6,546,377 | B1 | 4/2003 | Gravell et al. | |
| 6,548,768 | B1 | 4/2003 | Pettersson et al. | |
| 6,594,374 | B1 | 7/2003 | Beckstrom et al. | |
| 6,751,352 | B1 * | 6/2004 | Baharav et al. | 382/183 |
| 6,934,839 | B1 | 8/2005 | Pagel | |
| 7,225,166 | B2 * | 5/2007 | Brookner et al. | 705/62 |
| 2003/0002711 | A1 * | 1/2003 | Cordery et al. | 382/101 |
| 2007/0081694 | A1 * | 4/2007 | Ryan, Jr. | 382/100 |

FOREIGN PATENT DOCUMENTS

| | | | |
|---|---|---|---|
| EP | 1286531 | * | 5/2002 |
| EP | 1 533 758 | A2 | 5/2005 |
| WO | WO 00/65541 | | 11/2000 |

OTHER PUBLICATIONS

U.S. Appl. No. 09/711,718, filed Nov. 13, 2000, Inventor Perry Pierce et al.

* cited by examiner

METER TAPE WITH LOCATION INDICATOR USED FOR UNIQUE IDENTIFICATION

FIELD OF THE INVENTION

The invention disclosed herein relates generally to mail metering systems, and more particularly to generating and authenticating a fraud-resistant postage indicium for a mail piece.

BACKGROUND OF THE INVENTION

Currently, one can send a mailpiece (e.g., letter, package, etc.) through the United States Postal Service (hereafter referred to as USPS) using a postage indicium as evidence of postage payment. The sender may employ a postage meter certified by the USPS (or the postal service of another country) to generate the indicium. The indicium is generally printed on a meter tape (which is later attached to the mailpiece) or directly onto the mailpiece itself, using a printer associated with the postage meter, which may be, for example, an inkjet printer, a thermal transfer printer, or a laser printer. The indicium can subsequently be authenticated by the USPS. For example, an optical scanning device may be used to read the indicium and a verification algorithm may be used to verify the authenticity of the indicium (e.g., by decoding and interpreting information contained within the indicium).

As is known, a number of different postal indicia are specified by and permitted by the USPS. One particular type of indicium is specified in the USPS's Information Based Indicia Program (IBIP). An IBIP indicium includes both a machine readable portion and a human readable portion that may contain (without limitation) information related to the paid postage amount, the issuance date, the postage meter identification number, a postal service symbol, and the class of service. The machine readable portion is typically comprised of a Data Matrix symbology (i.e., a two-dimensional barcode) which may carry cryptographically protected information, such as the postage amount and other postal data that relates to the mailpiece and to the postage meter that prints the indicium. The encrypted information, which is usually referred to as a digital token or a digital signature, is used for authentication purposes. The encryption is also used to protect the integrity of the information, including the postage amount, imprinted on the mailpiece for later verification of postage payment. Since the digital token incorporates encrypted information relating to evidencing of postage payment, altering the printed information in an indicium is detectable by standard authentication procedures. Examples of systems that are capable of generating and printing such indicia are described in U.S. Pat. Nos. 4,725,718, 4,757,537, 4,775,246 and 4,873,645, each assigned to the assignee of the present invention.

One security problem that exists with the use of IBIP indicia relates to copying of the indicia for reuse. More specifically, a thief may attempt to re-use an indicium by making copies of an indicium on different pieces of meter tape. The piece(s) of meter tape with the copied indicium is then applied to a mail piece and deposited in the mail, without the thief having paid for the postage. Compounding this problem is the fact that technology has become so advanced that even standard consumer devices, such as photocopiers and printers, are capable of producing credible copies of the indicium (i.e., detection of the copied postage is difficult).

Another security problem relates to a single indicium being printed multiple times. For example, a thief may tamper with the postage meter device such that an indicium is printed multiple times (e.g., on different portions of the meter tape, on different mailpieces, etc.) even though the postage amount paid was intended to be associated with a single use.

Thus, there exists a need for a mail metering system that can generate indicia with suitable security properties to allow detection of fraudulent use of the indicia.

SUMMARY OF THE INVENTION

One aspect of the present invention relates to a method for producing a postage indicium on a meter tape including determining a location on the meter tape where the indicium is to be printed, generating the indicium with information related to the location incorporated therein, and printing the indicium on the meter tape at the location.

Another aspect of the present invention relates to a mail metering system including a detection device, a processor, and a printing device. The detection device is structured to detect a spatial indicator associated with a meter tape. The processor is in operable communication with the detection device and is adapted to execute a routine to determine a location on the meter tape where an indicium is to be printed and to generate the indicium with information related to the location incorporated therein. The printing device is in operable communication with the processor and is structured to print the indicium on the meter tape at the determined location.

Another aspect of the present invention relates to a method of authenticating a postage indicium printed on a meter tape. The method includes retrieving information stored within the indicium, the information identifying a first location where the indicium is supposed to be positioned relative to some initial point on the meter tape, detecting a spatial indicator to identify a second location where the indicium is actually positioned relative to the initial point on the meter tape, and comparing the first location to the second location.

Another aspect of the present invention relates to a mail authenticating system including a detection device and a processor. The detection device is structured to detect a spatial indicator and a postage indicium associated with a meter tape. The processor is in operable communication with the detection device. The processor is adapted to execute a routine to retrieve information stored within the indicium, the information identifying a first location where the indicium is supposed to be positioned relative to some initial point on the meter tape, to retrieve information encoded within the spatial indicator, the information identifying a second location where the indicium is actually positioned relative to the initial point on the meter tape, and to compare the first location to the second location.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION

As employed herein, the term "number" shall mean one or more than one and the singular form of "a", "an", and "the" include plural referents unless the context clearly indicates otherwise.

An apparatus and method for preventing postage fraud is discussed herein. More specifically, a meter tape having a symbology which identifies specific locations on the meter tape is employed in a mail metering system. The mail metering system detects the symbology, uses the symbology to determine a specific location on the meter tape where an indicium is to be printed, generates an indicium which includes the specific location information encoded therein, and prints the indicium at that specific location on the meter tape. The portion of the meter tape having the indicium is then applied to a mailpiece which is deposited into the mail. Once received, a postal authority may scan the indicium and the symbology from the meter tape that was placed on the mailpiece. The postal authority may then compare the specific location information encoded in the indicium to the actual location of the indicium relative to the symbology to verify that the indicium is authentic. The term location refers to coordinates in one or two dimensions with a margin of error determined by the equipment used to produce the meter tape with the symbology, and the metering equipment used to produce the indicium. It should be noted that while the following description is provided with respect to a mail metering system and authentication system for generating and verifying postage indicia that evidences payment of postage for mail pieces, the present invention is not so limited and can be used with any type of system in which an indicium is generated and printed to verify payment or other types of information.

Figure 1:
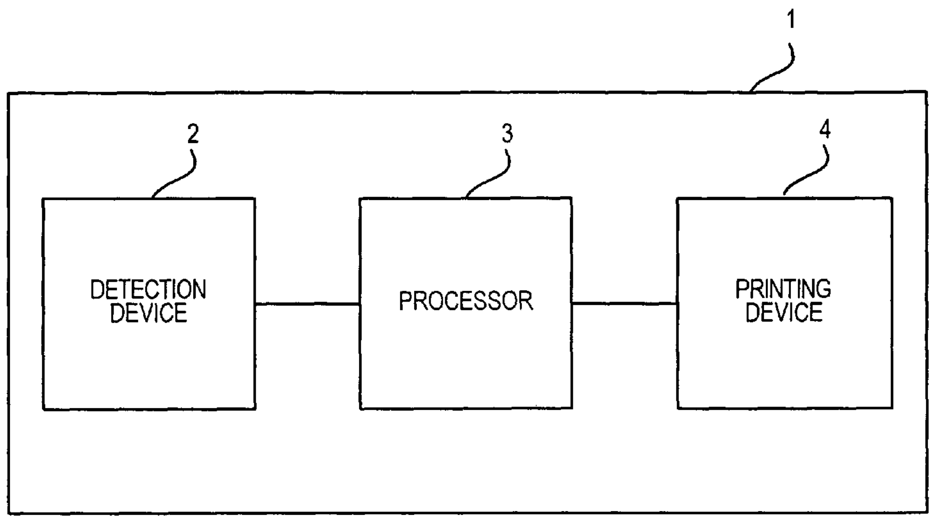
FIG. 1 is block diagram of a mail metering system according to the present invention.

FIG. 1 is a block diagram of a mail metering system 1 according to an exemplary embodiment of the present invention. Mail metering system 1 comprises a detection device, designated generally by the reference numeral 2, a processor, designated generally by the reference numeral 3, and a printing device, designated generally by the reference numeral 4. In the current embodiment, mail metering system 1 is structured to employ a meter tape (not shown in FIG. 1). The meter tape is generally supplied on a continuous roll and fed to the mail metering system 1 which segments the meter tape into various lengths. It should be understood, however, that the meter tape is not limited to tape on a continuous roll, but could also be media provided in sheets, media provided as pre-cut strips, or media with perforations.

Detection device 2 is structured to detect any number of markings present on a medium that is examined. For example (and without limitation), detection device 2 is structured to detect one or more spatial indicators associated with the meter tape. As employed herein, the term "spatial indicator" (and all derivatives thereof) refers generally to any symbology which corresponds to and/or identifies unique positions on a medium. For example, a spatial indicator may refer to a symbology which corresponds to one or more coordinates that specify the location of a point, line, area, etc. on a meter tape. Although the preferred embodiment shows a one-dimensional spatial indicator running parallel to the length of the indicium, the orientation of the spatial indicator may be perpendicular to the long side of the indicium. A two-dimensional coordinate of the indicium can be used as an input or an indicium printed on a sheet. An example of a symbology that provides a two-dimensional coordinate to locate a point on a sheet is the symbology as described in U.S. Pat. No. 6,548,768. Detection device 2 can be any conventional detection device such as, for example, a scanner.

Processor 3 is in operable communication with detection device 2 and is structured to execute any number of routines for, without limitation, generating and printing postage indicia. For example, processor 3 is structured to execute a routine that is adapted to receive information related to the detection of a spatial indicator on a meter tape; responsive to receipt of that information, to determine a location on the meter tape where an indicium is to be printed (e.g., a location where a particular portion of the indicium is to be located); to generate an indicium which incorporates the determined location information therein; and to cause the printing device 4 to print the indicium on the meter tape at the determined location. It should be noted that processor 3 may execute other routines while remaining within the scope of the present invention. For example, processor 3 is structured to execute routines related to other cryptographic processing of information contained within the indicium.

It should be noted that the mail metering system 1 may also include other components, the discussion of which have generally been omitted for clarity. For example, mail metering system 1 may include a number of input devices (not shown) which are in operable communication with processor 3 and which permit a user to interface with the mail metering system 1. The input devices may include a keyboard, mouse, and/or postage scale, among others.

Printing device 4 is in operable communication with the processor 3 and is structured to print the indicia generated by processor 3. In the exemplary embodiment, for example, printing device 4 is structured to print indicia on the meter tape. More specifically, printing device 4 is structured to print, at a specific location on the meter tape, an indicium which contains encoded location information identifying that specific location.

Generally, mail metering system 1 is employed to print postage for a mailpiece. It should be noted that a separate device may be used by a postal authority, for example the USPS, to verify that the postage printed by the mail metering system 1 is authentic by determining whether the indicium is printed in the proper place. This separate device may include a scanner structured to scan the printed postage and symbology on the meter tape and a processor structured to execute a routine adapted to decode the information within the indicium that identifies where the indicium is supposed to be positioned on the meter tape, determine where the indicium is actually positioned on the meter tape, and compare the supposed position of the indicium to the actual position of the indicium on the meter tape.

Figure 2:
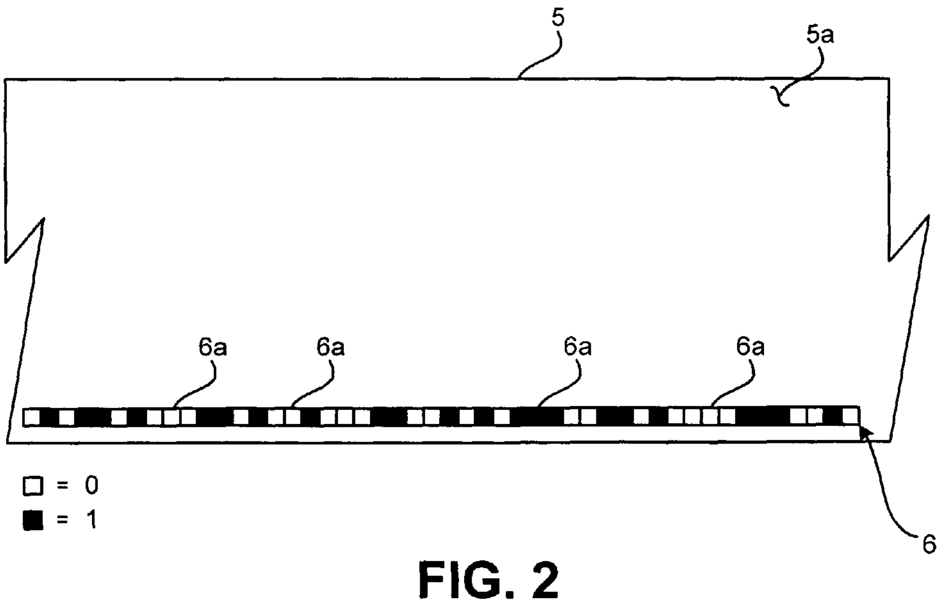
FIG. 2 illustrates a portion of a meter tape used by the mail metering system of FIG. 1.

FIG. 2 illustrates a portion of a meter tape 5 according to one embodiment of the present invention. As shown in FIG. 2, meter tape 5 has spatial indicator 6 located on a front surface 5*a* thereof. In the current embodiment, spatial indicator 6 includes symbology having a number of blocks 6*a* arranged in a serial fashion, wherein a "filled" block 6*a* represents the binary numeral "1" and an "empty" (or white) block 6*a* represents the binary numeral "0". The spatial indicator 6 contains sufficient information to ensure that various positions along the meter tape 5 on a roll can be identified (i.e., each portion of meter tape 5 of a given dimension may be uniquely identified with respect to the other portions of meter tape 5 along a given roll). As a result, the spatial indicator 6 allows the mail metering system 1 to easily determine the unique coordinate associated with the location where an indicium is to be printed on the surface 5*a*.

Although the spatial indicator 6 is discussed in the context of a number of blocks 6*a* arranged in a serial fashion, it should be apparent that other symbologies may be used while remaining within the scope of the present invention. More specifically, the symbology can be any type of one-dimensional code that holds sufficient information to ensure that the various portions along a meter tape may be uniquely identified. For example, PostNet code, OCR, and 4-state barcode symbologies (among others) are contemplated. Meter tape 5 may also incorporate additional security features. For example, meter tape 5 may include forensically verifiable features such as fluorescence, special security inks, a watermark, and/or unusual spacing of the symbology that makes undetectable copying difficult.

Figure 3:
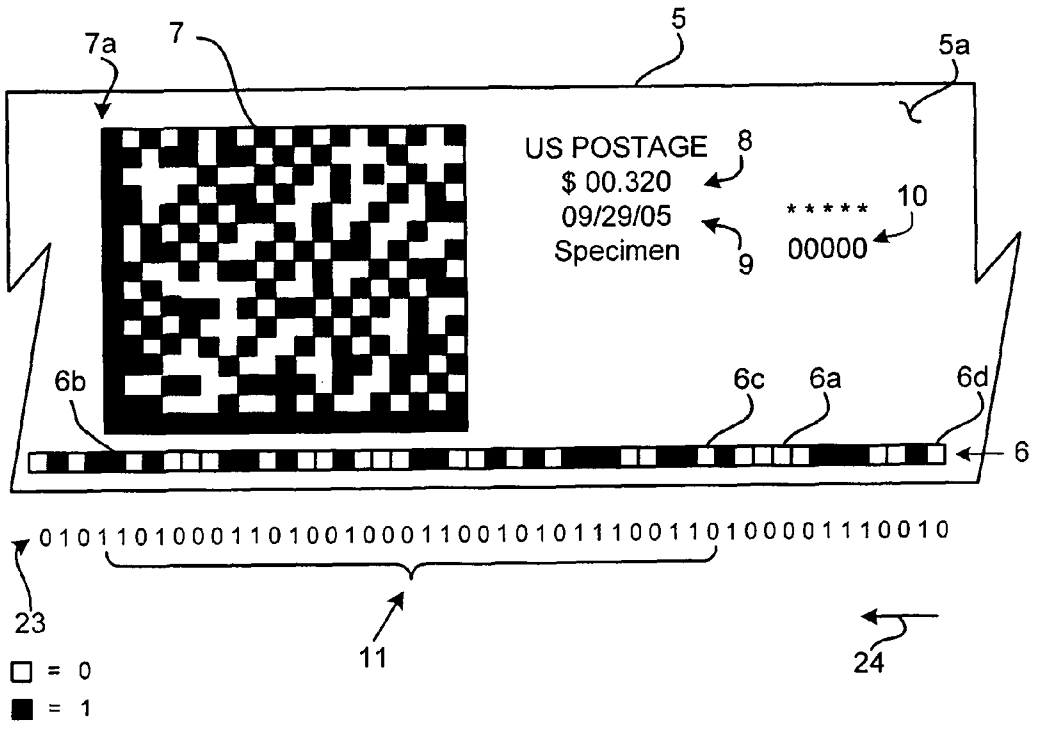
FIG. 3 illustrates the portion of meter tape shown in FIG. 2 with an indicium printed thereon.

FIG. 3 illustrates the portion of meter tape 5 shown in FIG. 2 with an IBIP indicium printed thereon. The indicium includes both machine readable and human readable items. While IBIP indicia are described herein, it should be understood that that is meant to be exemplary only and that other indicia capable of storing location related information as described herein may also be used. More specifically, the indicium shown in FIG. 3 includes a machine readable Data Matrix two-dimensional barcode 7 and human readable information such as the postage amount 8 for the mailpiece, the date 9 that the indicium was printed, and the identification number 10 of the mail metering system 1 which created the indicium. Typically, the indicium is required by the USPS to be a standard length, for example, two inches long. FIG. 3 also illustrates the bit stream 23 associated with the given spatial indicator 6.

It should be noted that in the exemplary embodiment, the meter tape 5 is processed by the mail metering device 1 in a serial fashion. For example, the meter tape 5 is passed through the detection device 3 and/or printing device 4 from right to left as illustrated by arrow 24 in FIG. 3. Accordingly, the rightmost bits in the bit stream 23 are detected by the detection device 2 before the leftmost bits in the bit stream. It is contemplated that, with minor modifications, an alternative embodiment may permit the direction of travel of the meter tape 5 through the mail metering system 1 to be reversed while still remaining within the scope of the present invention.

Figure 4:
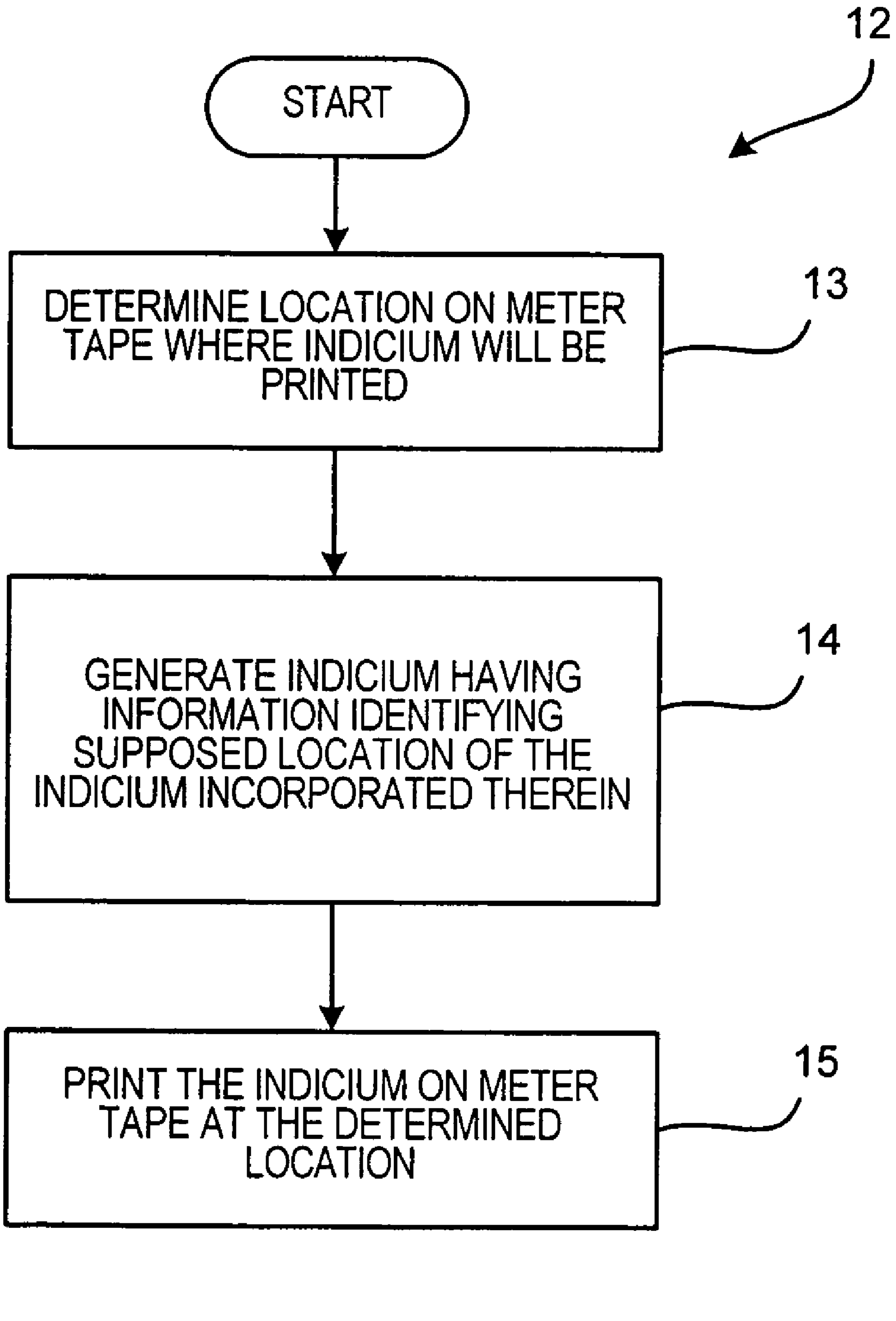
FIG. 4 is a flow chart illustrating an operational process for creating an indicium according to one embodiment of the present invention.

FIG. 4 is a flow chart illustrating an operational process 12 for creating an indicium according to one embodiment of the present invention. Operational process 12 is initiated when input information related to a mailpiece is received by the mail metering system 1. For example, when a user places a mailpiece on a postage scale (not shown) and enters the mailpiece address information, service level, etc. using a keyboard (not shown). After the input information is received, a determination is made at operation 13 as to where on the meter tapes the indicium will be printed in relation to the spatial indicator 6, given the specified dimensions of the indicium (i.e., the length), and in particular where in relation to the spatial indicator 6 the leftmost edge of a particular portion of the indicium, such as the barcode 7, will be located when printed.

In an exemplary embodiment shown in FIG. 3, the spatial indicator 6 is based on a linear feedback shift register (LFSR). As is known, an LFSR will result in a predictable and determinable bit stream pattern that will not repeat itself for a very large number of bits. The detection device 2 detects the spatial indicator 6 and determines the first several bits of the bit stream 23 from the origin 6*d* (origin bit) of the current portion of meter tape 5 (e.g., in FIG. 3 from right to left 0, 1, 0, 0, 1, 1, 1, etc.). Processor 3 then executes a routine which is adapted to employ an LFSR to enable the processor 3 to determine which portion of the meter tape 5 is currently being processed within the mail metering system 1 and to predict a future bit sequence of the spatial indicator 6 on that portion of the meter tape 5. More specifically, the LFSR enables the processor 3 to determine what the bit stream will be at the location on the meter tape 5 that is the some distance away from the origin 6*d*. For example, if (as discussed above) the standard length of the indicium to be printed is two inches, the LFSR enables the processor to predict which bits will be present in the bit stream 23 starting at the origin 6*d* and extending some distance greater than two inches away. As illustrated in FIG. 3, the processor 3 is able to determine that bit 6*b* will be located two inches away from the origin 6*d* and that the bit stream will be as shown in FIG. 3 between 6*d* and 6*b*.

In the current embodiment, an N-bit LFSR is selected so that the cycle is $(2^N-1)$ bits. As a result, a 32-bit LFSR would repeat after approximately four billion bits, whereas a 64-bit LFSR would not repeat for any reasonable estimate of usage. The LFSR uses an array of N+1 registers $R_0(t) \ldots R_N(t)$ and N taps $C_1 \ldots C_N$. At each step, $R_0(t)$ is the output bit. The update for step "t" is $R_N(t+1)=XOR_{j=0 \ldots N-1}(R_j(t)\ AND\ C_{N-j})$. For i from 0 to N−1, set $R_i(t+1)=R_{i+1}(t)$ and output $R_0(t)$. There is no need to parse the output because each bit is the next in sequence generated by the same algorithm.

It should be noted that mail metering system 1 in the embodiment of FIG. 3 has access to the full state of the LFSR and to the meter tape symbology. As a result, prediction of future bits within the bit stream 23, and thus determination of where the indicium is supposed to be printed, is easily completed. In contrast, a thief only has access to the meter tape symbology (and not the full state of the LFSR), thus making the prediction of future bits much more difficult.

Although discussed in conjunction with an LFSR, it should be noted that a routine adapted to employ another algorithm may be employed while remaining within the scope of the present invention. For example, each inch (or other unit of measure) may be labeled using a Fibonacci representation of the distance from the origin 6*d* in inches (or other unit of measure). The Fibonacci sequence is $[F_0, F_1, \ldots]=[1, 2, 3, 4, 5, \ldots F_n=F_{n-1}+F_{n-2} \ldots]$. The Fibonacci representation of a number N is constructed by finding the largest element $F_n$ of the Fibonacci sequence smaller than N. The $n^{th}$ position in the expansion of the number is set to 1. The procedure is repeated with $N-F_n$ until there is zero remainder. One advantage of using a Fibonacci representation is that it is binary (0's and 1's) but there are never two 1's in-a-row. Thus, two 1's in-a-row appearing in the bit stream 23 can be used to help parse the stream of bits into locations. The first few natural numbers are represented as [1, 2, 3, 4, 5, 6, 7, 8, 9]=>[1, 10, 100, 101, 1000, 1001, 1010, 10000, 10001].

It should also be noted that the printer 4 may be instructed to randomly advance the meter tape 5 prior to executing operation 13 (i.e., effectively changing the origin 6*d* for that portion of the meter tape). The random advance makes it more difficult for a thief to predict the supposed location of the next indicium when a number of meter tape segments having the same lengths are printed in sequence.

Other alternatives may also be used. For example, a random or pseudorandom stream of data may be generated and used; any systematically generated stream of data may be used; and/or a stream of data may be generated using a key such that each sequence in the stream can systematically be checked for authenticity. As yet another example, detection device 2 may be placed at a distance sufficiently upstream of the printing device 4. Accordingly, the detection device 2 can detect the spatial indicator 6 such that the processor 3 knows the bit stream (i.e., does not need to predict which bits will be seen). Thus, processor 3 can determine which portion of the meter tape 5 is currently being processed within the mail metering system 1. The processor 3 can generate an indicium incorporating the specific location on the meter tape 5 where the indicium is to be printed. Accordingly, when that portion of the meter tape 5 reaches the downstream printing device 4, the printing device 4 can print the indicium at that specific location.

After the location as to where the indicium will be printed on the meter tape 5 is determined with reference to the spatial indicator 6, operational control is passed to operation 14 shown in FIG. 4 where the indicium is generated. The indicium includes location information encoded therein. More specifically, bar code 7 includes therein information identifying the supposed location on meter tape 5 where the indicium is to be printed. In the example illustrated in FIG. 3, operation 13 determined that the indicium should begin at the location on the surface 5*a* of the meter tape 5 corresponding with block 6*b* (i.e., the leading edge 7*a* of bar code 7 should be located on the surface 5*a* of meter tape 5 at the position corresponding to block 6*b* which in the current example is two inches from the origin 6*d*). Thus, according to an aspect of the present invention, a portion 11 of the bit stream 23 starting with the bit associated with block 6*b* (such as a 32-bit portion starting with the bit associated with block 6*b* and ending with the bit associated with block 6*c*) may be identified and included in the indicium. More specifically, information identifying the portion 11 of the bit stream 23 may be encrypted and incorporated into the bar code 7.

After the indicium is generated in operation 14, the indicium is printed on the meter tape 5 in operation 15. More specifically, printing device 4 prints the indicium at the location on the meter tape 5 that was determined in operation 13. In the current example, printing device 4 prints the indicium such that the leading edge 7*a* of bar code 7 (which is the beginning of the indicium) is located on the surface 5*a* of meter tape 5 at the position corresponding with block 6*b* (i.e., the starting location as determined in operation 13).

Figure 5:
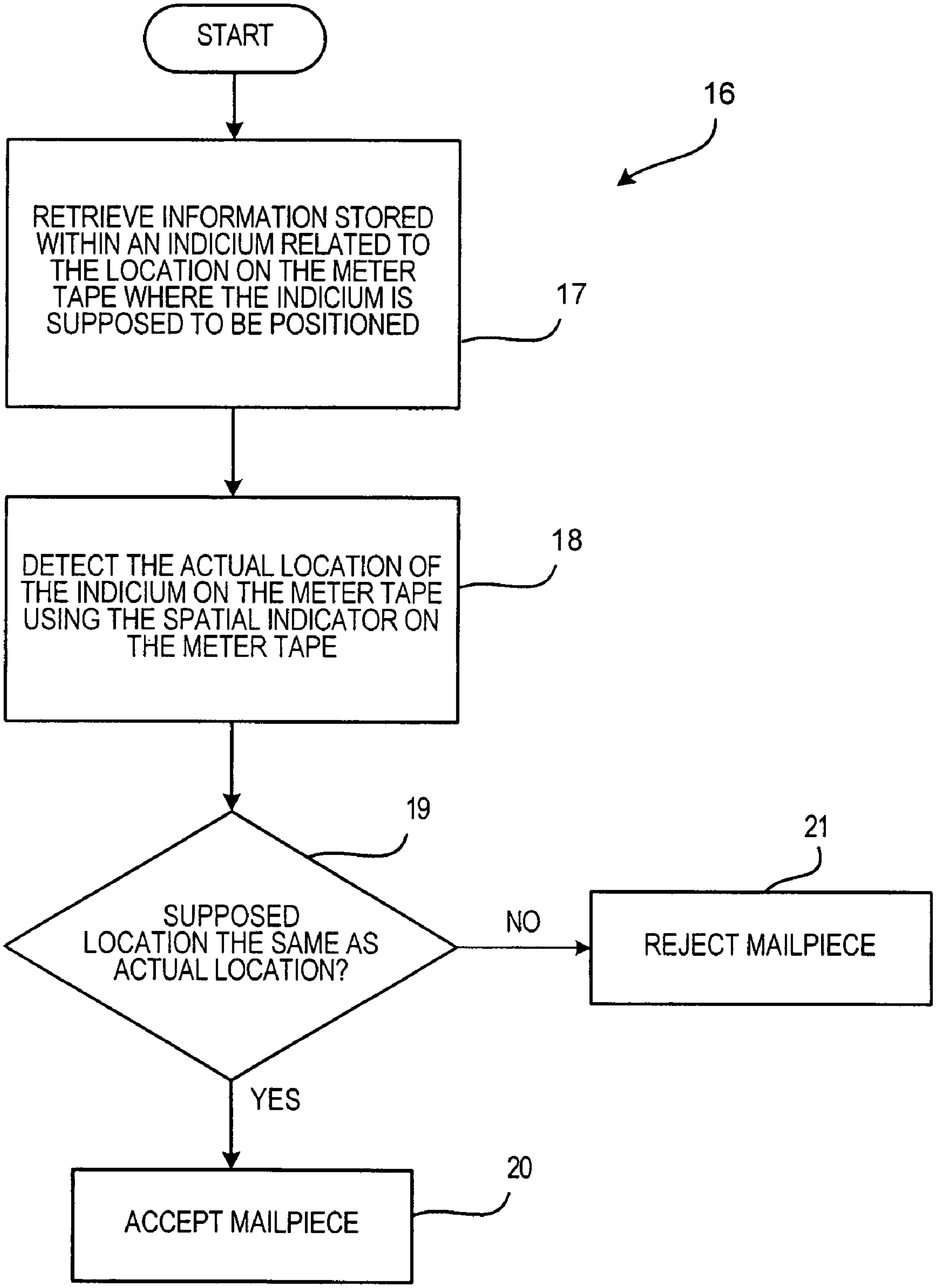
FIG. 5 is a flow chart illustrating an operational process for authenticating an indicium according to one embodiment of the present invention.

FIG. 5 is a flow chart illustrating an operational process 16 for authenticating an indicium according to one embodiment. Typically, operational process 16 is executed by a postal authority, such as the USPS. Operational process 16 is initiated when a mailpiece indicium is scanned during the authentication process. In operation 17, the information stored within the indicium is retrieved. More specifically, the information related to the location on the meter tape 5 where the indicium is supposed to be positioned is retrieved. In the current example, for instance, the information identifying the portion 11 (e.g., a 32-bit portion) of the bit stream 23 is retrieved from bar code 7 and decrypted.

Operational control then passes to operation 18 where the spatial indicator 6 on the surface 5*a* of meter tape 5 is detected. In general, the actual location of the indicium is determined in operation 18. More specifically, in the embodiment shown in FIG. 3, the block corresponding to the location on the surface 5*a* of meter tape 5 where the indicium begins (i.e., block 6*b*) and the sequence of bits for a certain number of bits thereafter (e.g., 32) is detected/identified in operation 18.

A determination is made at operation 19 as to whether the supposed location of the indicium (i.e., as retrieved from the indicium in operation 17) is the same as the actual location (i.e., as detected in operation 18). In the embodiment shown in FIG. 3, this is done by comparing the bit stream information obtained in operation 17 to the bit stream information obtained in operation 18. If the supposed location and the actual location are the same, control branches "YES" and the mailpiece is accepted at operation 20. If the supposed location and the actual location are not the same, control branches "NO" and the mailpiece is rejected at operation 21.

Figure 6:
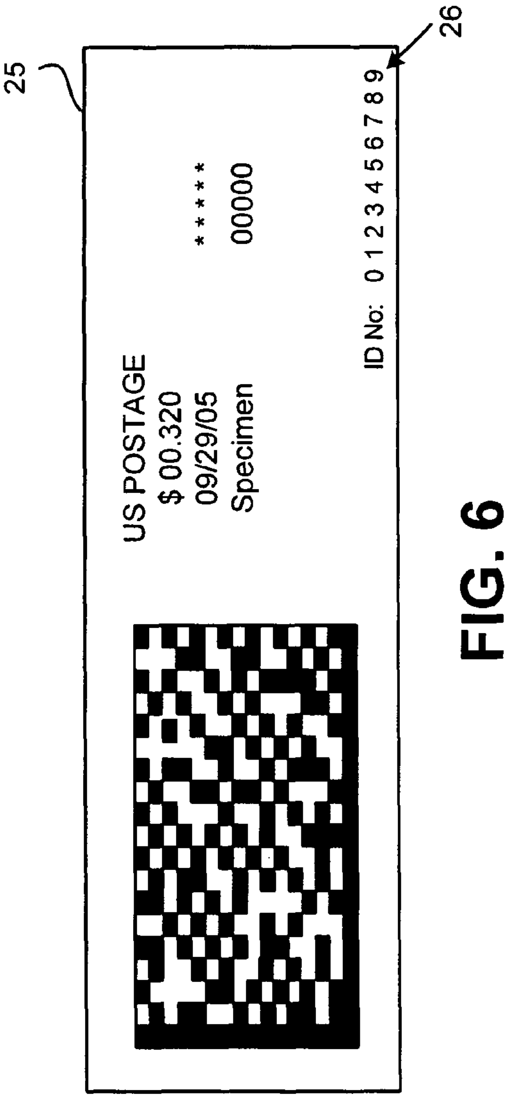
FIG. 6 (PRIOR ART)
FIG. 6 illustrates a known mailing label.
Figure 7:
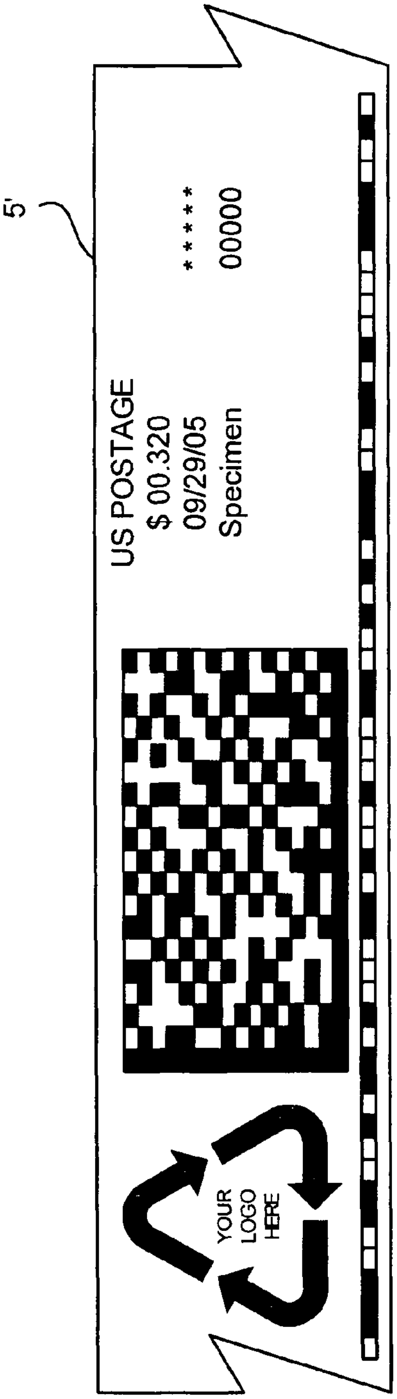
FIG. 7 illustrates a section of meter tape having an indicium and a logo printed thereon.
Figure 8:
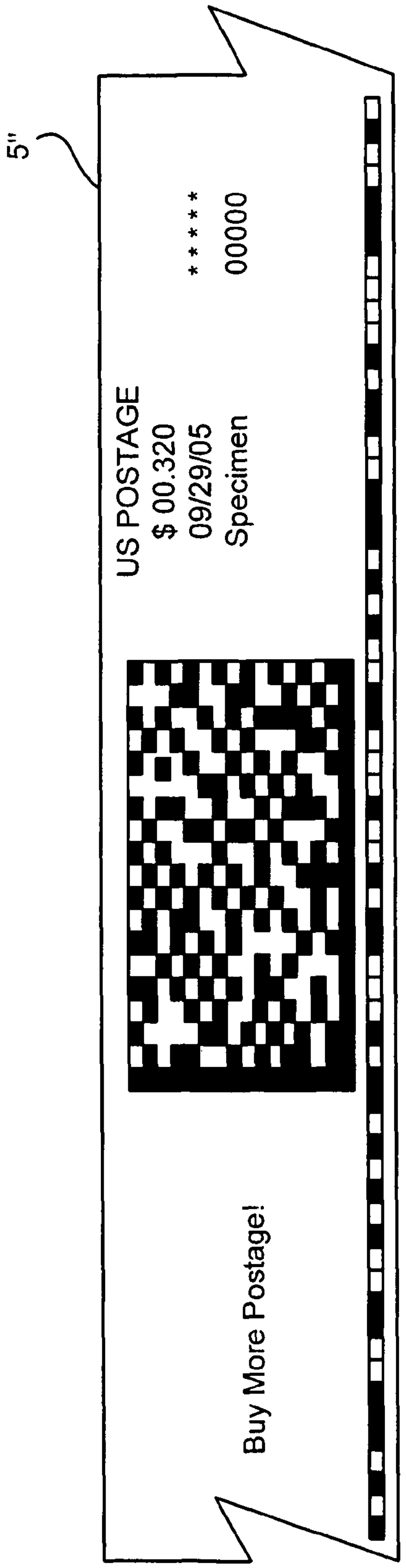
FIG. 8 illustrates a section of meter tape having an indicium and an advertisement printed thereon.
Figure 9:
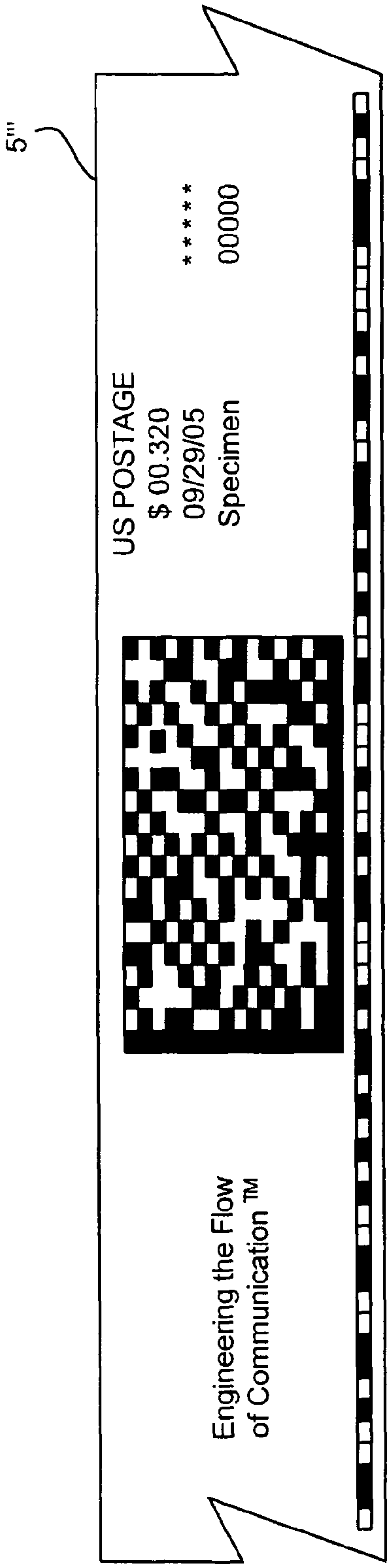
FIG. 9 illustrates a section of meter tape having an indicium and a slogan printed thereon.

Unlike stock mailing labels which are of fixed length, the length of the meter tape 5 may vary. As will be shown in FIGS. 6-9, additional information such as (and without limitation) logos, advertisements, and slogans which will not fit on a stock mailing label may easily be printed on the meter tape 5. More specifically, FIG. 6 illustrates a known mailing label 25 incorporating a unique ID number 26 thereon. The mailing label 25 also has an indicium printed thereon. As discussed above, the indicium is typically required to be a standard length (e.g., 2 inches). As a result, mailing label 25 does not include enough space to print a logo, advertisement, and/or slogan thereon. In contrast, meter tape 5 is typically supplied in a roll such that variable sized sections can be cut to length as needed. For example, the sections of meter tape illustrated in FIGS. 7-9 (all of which, as discussed above, include symbology for preventing fraud) are of variable length. FIG. 7 illustrates a section of meter tape 5' having the same indicium as shown in FIG. 6 plus a logo printed thereon, FIG. 8 illustrates a section of meter tape 5" having the same indicium as printed in FIG. 6 plus an advertisement printed thereon, and FIG. 9 illustrates a section of meter tape 5''' having the same indicium as shown in FIG. 6 plus a slogan printed thereon. Each section of the meter tape (5', 5", and 5''') shown in FIGS. 7-9 are of different lengths; each being longer than the mailing label 25 shown in FIG. 6. Thus, according to the principles of the present invention, a user desiring to print fraud resistant postage also has the ability to add a logo, advertisement, and/or slogan next to their postage indicium.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method for producing an indicium on a meter tape in a metering system comprising:

determining by a processing device of said metering system a location on said meter tape where said indicium is to be printed based on a spatial indicator provided on said meter tape;

generating by said processing device said indicium with information including said location on said meter tape where said indicium is to be printed incorporated therein; and printing by a printing device of said metering system said indicium on said meter tape at said location, wherein said location on said meter tape where said indicium is to be printed that is incorporated into said indicium can be used to verify authenticity of said indicium by comparing said location on said meter tape where said indicium is to be printed to an actual location of said indicium on said meter tape.

2. The method of claim 1 wherein said determining a location on said meter tape where said indicium is to be printed further comprises:

detecting by a detection device of said metering system the spatial indicator provided on said meter tape;

responsive to said detecting, determining by said processing device where said indicium is to be printed in relation to said spatial indicator.

3. The method of claim 2 wherein said spatial indicator includes a symbology positioned on a portion of said meter tape, said symbology corresponding to a number of coordinates for specifying the location of a number of points on said meter tape and wherein said detecting said spatial indicator comprises scanning said symbology to detect a particular one or more of said coordinates.

4. The method of claim 3 wherein said determining where said indicium is to be printed in relation to said spatial indicator includes:

identifying an origin point of said spatial indicator on said meter tape, said origin point being a first one of said coordinates; and determining a second one of said coordinates a certain distance from said origin point, wherein said second one of said coordinates will correspond with a location of a predetermined portion of said indicium when printed.

5. The method of claim 1 wherein said determining where said indicium is to be printed in relation to said spatial indicator includes employing one of a linear feedback shift register algorithm or a Fibonacci sequence.

6. The method of claim 1 wherein said spatial indicator includes a symbology employing a bit stream, wherein said determining where said indicium is to be printed in relation to said spatial indicator includes identifying a portion of said bit stream, and wherein said generating said indicium with information related to said location incorporated therein comprises:

encrypting information related to said portion of said bit stream; and incorporating said encrypted information into said indicium.

7. The method of claim 1, wherein the indicium is a postage indicium that evidences payment of postage for a mail piece.

8. A metering system for generating and printing an indicium comprising:

a detection device structured to detect a spatial indicator associated with a meter tape;

a processor in operable communication with said detection device, said processor adapted to execute a routine to:

determine a location on said meter tape in relation to said spatial indicator where said indicium is to be printed; and generate said indicium with information including said location on said meter tape where said indicium is to be printed incorporated therein; and a printing device in operable communication with said processor, said printing device structured to print said indicium on said meter tape at said location, wherein said location on said meter tape where said indicium is to be printed that is incorporated into said indicium can be used to verify authenticity of said indicium by comparing said location on said meter tape where said indicium is to be printed to an actual location of said indicium on said meter tape.

9. The metering system of claim 8 wherein said spatial indicator includes a symbology positioned on a portion of said meter tape, said symbology corresponding to a number of coordinates for specifying the location of a number of points on said meter tape.

10. The metering system of claim 8 wherein said detection device is a scanner structured to scan said symbology to detect a particular one or more of said coordinates.

11. The metering system of claim 8 wherein said routine is further adapted to employ at least one of a linear feedback shift register algorithm or a Fibonacci sequence to determine said location on said meter tape in relation to said spatial indicator.

12. The metering system of claim 8 wherein said spatial indicator includes a symbology employing a bit stream, and said routine is further adapted to identify a portion of said bit stream to determine said location, and to generate said indicium with information related to said location incorporated therein, said routine is further adapted to:

encrypt information related to said portion of said bit stream; and incorporate said encrypted information into said indicium.

13. The metering system of claim 8, wherein the metering system is a mail metering system and the indicium is a postage indicium that evidences payment of postage for a mail piece.

* * * * *